United States Patent [19]

Topham-Clements

[11] 3,903,914

[45] Sept. 9, 1975

[54] GAS RELEASE VALVE

[75] Inventor: Hubert John Topham-Clements, Northolt, England

[73] Assignee: The Walter Kidde Company Limited, Northolt, England

[22] Filed: Nov. 8, 1972

[21] Appl. No.: 304,784

[30] Foreign Application Priority Data
Nov. 8, 1971  United Kingdom............... 51844/71

[52] U.S. Cl. ..................... 137/68; 137/599; 251/38; 251/28
[51] Int. Cl.............................................. F16k 13/04
[58] Field of Search ........... 251/38; 137/68, 71, 599

[56] References Cited
UNITED STATES PATENTS

| | | | |
|---|---|---|---|
| 851,165 | 4/1907 | Fernald............................... | 251/38 |
| 2,236,564 | 4/1941 | Cornell, Jr. ........................... | 137/71 |
| 2,243,957 | 6/1941 | Heine et al. ......................... | 251/38 |
| 2,426,065 | 8/1947 | Stevens et al..................... | 251/38 X |
| 3,667,722 | 6/1972 | Katz et al......................... | 251/38 X |

Primary Examiner—Arnold Rosenthal
Attorney, Agent, or Firm—Darby & Darby

[57] ABSTRACT

A gas release valve, for attachment to a pressure gas cylinder for example, includes a main valve element which is held on its seat by pressure in a chamber to which gas at inlet pressure is metered. Escape of gas from the chamber to the outlet side of the valve through an aperture in the main valve element is prevented by a pilot valve element which is resiliently biased to block the aperture. A rod is provided to displace the pilot valve element and thereby release pressure in the chamber and allow inlet gas pressure acting on the peripheral region of the main valve to move it away from its seat and open the valve. When the pilot valve element is released the aperture in the main valve element is again blocked and as pressure builds up in the chamber the main valve element engages its seat to block the valve.

3 Claims, 3 Drawing Figures

GAS RELEASE VALVE

This invention relates to a valve for releasing gas from a source of gas under high pressure, such as a pressure gas cylinder.

The present invention provides a gas release valve comprising a valve body having a gas inlet and a gas flow passage connecting the inlet to a gas outlet, a main valve element having a seating surface arranged to engage a valve seat in said body to block the gas flow passage and close the valve, in the closed position of the valve said surface having a central region facing the outlet side of the valve and a peripheral region exposed to pressure on the inlet side of the valve, said central region having an aperture passing through the main valve element to a chamber on the opposite side of the main valve element to the valve seat, means for metering gas at inlet pressure into said chamber, a pilot valve element arranged to be urged by pressure in said chamber and resiliently biased to press against the main valve element to block said aperture, the pressure in said chamber and said resilient bias being sufficient to normally press the main valve element against its seat to block the valve, and means for displacing the pilot valve element from its engagement with the main valve element thereby releasing pressure in said chamber through said aperture and allowing pressure acting on the peripheral region of the seating surface to move the main valve element away from its seat to open the valve.

The means for metering gas into the chamber may include a gas flow path constituted by the spacing between the main valve element and a bore in the valve body in which the main valve element is guided for movement. The means for displacing the pilot valve element may include a rod which is slidably mounted in the valve body so that its end can pass through the aperture in the seating surface to displace the pilot valve element. Movement of the rod may be guided by a piston or diaphragm connected to the rod and acting in a cylinder in the valve body. Where a piston or diaphragm is provided the valve may be operated by fluid pressure, e.g. pneumatically or by the exhaust gases from an explosive cartridge, by admission of fluid to the cylinder to move the piston or diaphragm. Alternatively an actuating lever which operates the rod by a cam action may be provided. In either case return of the rod to the position in which the valve is closed can be provided by the resilient bias and pressure in the chamber acting on the rod through the pilot valve element.

The invention will now be further described by way of example only with reference to the accompanying drawings, in which.

Figure 1:
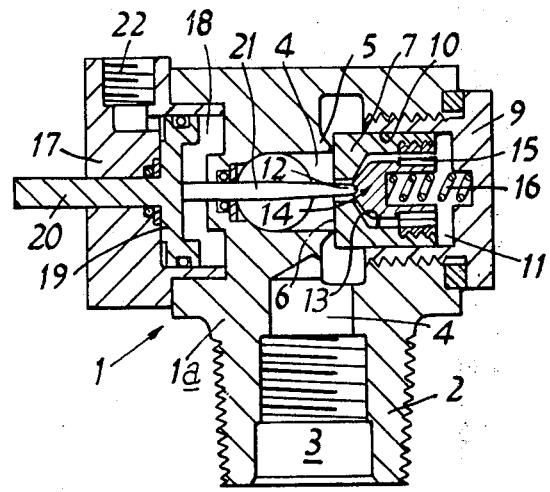
FIG. 1 is a sectional view of a gas release valve.
Figure 2:
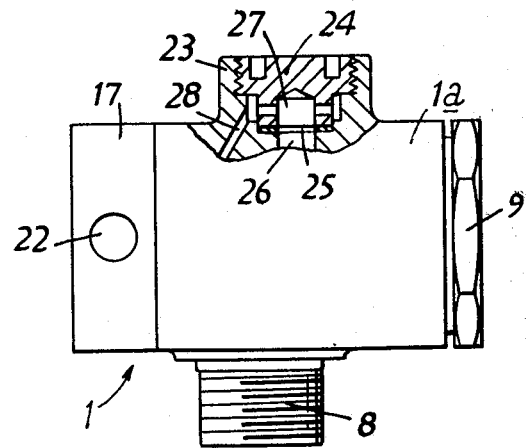
FIG. 2 is a plan view, partly in section, of the valve of FIG. 1 from above.

One form of valve for releasing gas from a high pressure gas source is shown in FIGS. 1 and 2 and has a valve body 1 which includes a main part 1a adapted for connection to the outlet of a pressure gas cylinder (now shown) by means of a threaded boss 2. The boss 2 contains a gas inlet 3 leading to a gas flow passage 4. An annular valve seat 5 is arranged in the passage 4 and a seating surface 6 on a main valve element 7 is arranged to engage this seat to block the passage thereby closing the valve. On the other side of the seat 5 the passage 4 leads to a gas outlet within a further threaded boss 8.

The valve body 1 includes a plug 9 which has a blind bore 10 and which is threaded into the main part 1a of the valve body 1. The main valve element 7 is slidably received in the bore 10 and a chamber 11 is defined in the valve body between the element 7 and the end of the bore 10. The spacing between the element 7 and the sides of the bore 10 is such that gas at inlet pressure can meter at a predetermined rate from the passage 4 into the chamber 11. The seating surface 6 of the main element 7 has a peripheral region which is exposed to gas at inlet pressure and a central region which, when the valve is closed as shown in FIG. 1, is exposed to the outlet side of passage 4.

An aperture 12 in the central region of surface 6 leads to a recess or bore 13 formed in the rear of the main valve element 7. A pilot valve element 14 is slidably supported in a guide 15 mounted in the side of the bore 13 and normally seats on the aperture 12 to block it. The pilot valve element 14 is urged against the aperture 12 by gas pressure in the chamber 11 and also by a compression spring 16 arranged between the element 14 and the end of the bore 10. Thus the force exerted on the main valve element 7 by the pilot valve element 14, together with the pressure in the chamber 11 acting on the rear of the main element itself, tends to close the valve by pressing the surface 6 onto its seat 5. Against this there is an opposite force, tending to open the valve, produced by inlet gas pressure on the peripheral region of the surface 6. When the chamber 11 contains gas at inlet pressure the closing pressure between the surface 6 and its seat 5 is sufficient to substantially prevent leakage through the valve.

The valve body 1 also includes a second plug member 17 which is received within a recess in the main part 1a of the valve body at a position generally opposite to that of the plug 9. The plug member 17 defines a cylinder 18 within which moves a piston 19. The piston 19 has an integral actuator 20 which extends through the plug member 17 and an operating rod 21 which extends from the opposite side of the piston to the actuator. The operating rod 21 sealingly passes into the gas flow passage 4 and is aligned with the aperture 12 in the main valve element 7.

In order to open the valve to allow gas to pass through the passage 4 to the outlet the actuator 20 may be pressed manually so that the operating rod 21 passes through the aperture 12 and displaces the pilot valve element from its sealing position on the aperture. The pressure in the chamber 11 is released through the aperture 12 and, since both closing gas pressure and the force of spring 16 have been removed from the main element 7, the inlet gas pressure, initially acting on the peripheral region of surface 6 and subsequently also on the central region, pushes the main element away from its seat to allow gas to flow through the passage 4 to the outlet in boss 8.

It should be understood that the main valve element 7 normally remains in its open position only whilst the pilot element 14 is held away from its sealing position on the aperture 12. Directly the actuator 20 is released the spring 16 presses the pilot element 14 against the aperture 12 to reseal it. The pressure in chamber 11 then builds up again owing to gas substantially at inlet pressure metering between the main element 7 and the bore 10. As pressure in the chamber 11 increases the main element is forced back towards its seat 5 and after a short period the valve is again closed. It has been found with one embodiment constructed in accordance with the invention that when using inlet gas pressures of several hundred pounds per square inch the time taken for the valve to close is of the order of 1 second.

As shown in FIG. 1 the valve is adapted for an alternative mode of operation. The plug member 17 has a transverse threaded bore 22 which connects with the space behind the piston 19 in the cylinder 18. An electrically detonated explosive cartridge may be inserted in the bore 22 and on firing of the cartridge gas pressure moves the piston 19 to open the valve as previously described. The gas pressure within the cylinder 18 would then be sufficient to hold open the valve until the contents of the main gas cylinder were discharged. This arrangement may be particularly useful for automatic discharge of carbon dioxide or other gas cylinders intended for use as fire extinguishers. The fluid pressure required to move the piston 19 may be derived from sources other than an explosive cartridge device; for example an air line may be connected to the threaded part of bore 22.

If required the valve body 1 may be provided with a bleed or pressure release for the gas in cylinder 18 so that the valve may be closed before all gas in the main cylinder is discharged. In this case it is an advantage to retain the actuator 20 in the construction of the valve since this gives an indication of when the valve is fully closed.

The valve is also provided with a safety device which relieves pressure on the inlet side of the valve if this should rise above a predetermined level. As shown in FIG. 2 the valve body 1 has a boss 23 which receives a threaded safety plug 24. A rupturable disc 25 is held in sealing engagement with a gas passage 26 by the plug 24. The passage 26 leads to the annular region on the inlet side of the valve seat 5. If inlet pressure rises too high the disc 25, which is exposed to inlet gas pressure on its inner face, ruptures and allows gas to pass through a chamber 27 in the plug 24 to a channel 28 in the valve body, which channel leads to the outlet side of the gas passage 4.

Figure 3:
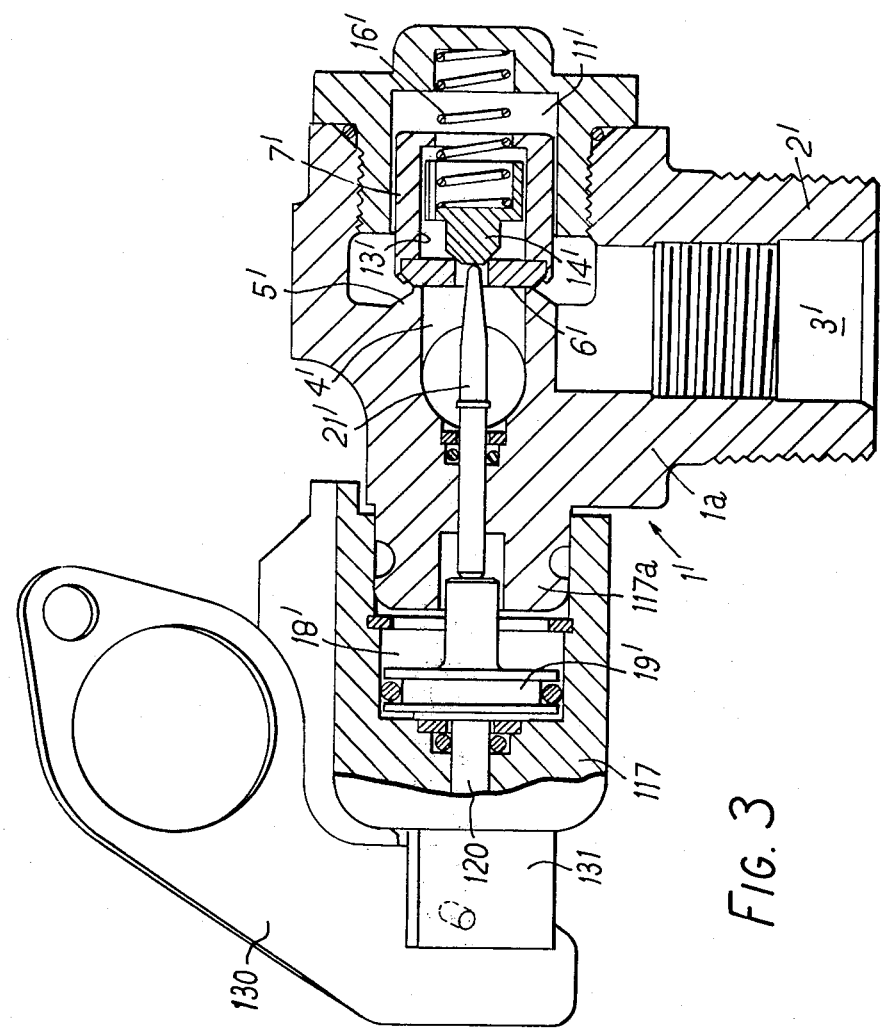
FIG. 3 is a sectional view of a modified gas release valve.

The form and operation of the valve shown in FIG. 3 is similar to that of the valve of FIGS. 1 and 2 but differs in certain respects. Similar reference numerals have been used for similar parts. The operating mechanism of the modified valve includes a piston 19' which operates in a cylinder 18'. The cylinder is formed by an internal bore in a cap member 117 which sealingly fits over a boss 117a in the main part 1'a of the valve body 1'. An actuator rod 120 is connected to the piston 19' and extends through the end of the cap member 117. An operating lever 130 is pivotally mounted on a flange 131 extending from the cap member 117 and is arranged so that angular movement of the lever 130 about its pivot axis causes inward movement of the rod 120 by a cam action. A safety pin 132 which prevents inadvertent operation is also provided.

As before the valve may also be operated by admission of fluid pressure to the cylinder 18' to move the piston 19'; this may conveniently be carried out pneumatically. For convenience a sealable fluid outlet connection (not shown) from the cylinder is provided so that other valves may be operated in series by the same fluid pressure source.

I claim:

1. A gas release valve comprising a valve body having a gas inlet, a gas outlet, a gas flow passage extending from the inlet to the outlet, a main valve seat surrounding a main valve opening intermediate the ends of the flow passage, and a first chamber disposed at the upstream side of the valve, an annular main valve member slidably mounted in the chamber for movement to engage and disengage from the main valve seat to close and open the valve, said valve member projecting laterally beyond the valve seat to provide a portion whereon the gas pressure upstream of the main valve seat can act in a sense to open the valve, the chamber being in restricted communication with the gas flow passage at the upstream side of the main valve seat so that, when the valve is closed, the chamber is pressurized in a sense to press the main valve member against the main valve seat, said annular main valve member having a central opening which places the chamber in communication with the flow passage at the downstream side of the main valve seat and which is bounded by a pilot valve seat, a pilot valve member disposed at the upstream side of the pilot valve seat and resiliently loaded into engagement with the pilot valve seat, said valve body having a by-pass passage opposite ends of which open to flow passage upstream and downstream respectively of the main valve seat and a safety bursting disc blocking said by-pass passage, the valve body further including a cylinder which is coaxial with said first chamber but which is sealed therefrom and from the flow passage, a piston slidably mounted in the cylinder, a rod extending between the piston and the pilot valve member and slidably mounted in the valve body, said cylinder having an inlet port for the supply of pressure fluid to the cylinder to operate the piston and said rod to lift the pilot valve member off the pilot valve seat against the resilient loading on the pilot valve member, and a manually operable lever mounted externally of the valve body and operatively connected to the piston for enabling the pilot valve member to be lifted from the pilot valve seat by operation of the lever.

2. A gas release valve as claimed in claim 1 wherein the piston has an actuator rod attached thereto which is slidably and sealingly mounted in the valve body at the side of the piston remote from the main valve opening, said actuator rod projecting externally of the valve body for cam-action engagement by said lever.

3. A valve according to claim 1 further comprising a sealable fluid outlet connection for said cylinder.

\* \* \* \* \*